United States Patent
Omatsu et al.

(10) Patent No.: US 10,099,921 B2
(45) Date of Patent: Oct. 16, 2018

(54) METHOD FOR PRODUCING ORGANIC HELICAL STRUCTURE, AND ORGANIC HELICAL STRUCTURE PRODUCED USING SAID METHOD

(71) Applicant: NATIONAL UNIVERSITY CORPORATION CHIBA UNIVERSITY, Chiba (JP)

(72) Inventors: Takashige Omatsu, Chiba (JP); Katsuhiko Miyamoto, Chiba (JP)

(73) Assignee: NATIONAL UNIVERSITY CORPORATION CHIBA UNIVERSITY, Chiba (JP)

( * ) Notice: Subject to any disclaimer, the term of this patent is extended or adjusted under 35 U.S.C. 154(b) by 420 days.

(21) Appl. No.: 14/890,161

(22) PCT Filed: May 12, 2014

(86) PCT No.: PCT/JP2014/062634
§ 371 (c)(1),
(2) Date: Nov. 10, 2015

(87) PCT Pub. No.: WO2014/181890
PCT Pub. Date: Nov. 13, 2014

(65) Prior Publication Data
US 2016/0107888 A1 Apr. 21, 2016

(30) Foreign Application Priority Data

May 10, 2013 (JP) .................................. 2013-100784

(51) Int. Cl.
*B82Y 40/00* (2011.01)
*B82Y 30/00* (2011.01)
(Continued)

(52) U.S. Cl.
CPC ............... *B82Y 40/00* (2013.01); *B82Y 30/00* (2013.01); *C08G 73/02* (2013.01); *C08J 7/00* (2013.01);
(Continued)

(58) Field of Classification Search
CPC ............................... B82Y 40/00; B82Y 30/00
See application file for complete search history.

(56) References Cited

U.S. PATENT DOCUMENTS

2007/0201118 A1  8/2007  Omatsu et al.
2014/0226685 A1  8/2014  Omatsu et al.

FOREIGN PATENT DOCUMENTS

JP  2003039400 A  *  2/2003
JP  2004-294544 A     10/2004
(Continued)

OTHER PUBLICATIONS

Ambrosio et al. "Light-induced spiral mass transport in azo-polymer films under vortex-beam illumination", Nat. Commun., 2012, vol. 3, Article 989, p. 1-9.*

(Continued)

*Primary Examiner* — Gerard Higgins
(74) *Attorney, Agent, or Firm* — Keiji Masaki; International Knowledge Asset Office

(57) ABSTRACT

Provided is the possibility for new application of optical vortices. In order to do so, the method for producing an organic helical structure according to the present invention entails irradiating the surface of macromolecules that exhibit a photoisomerization reaction with an optical vortex, thereby forming a nanoscale helical structure on the surface of the macromolecules. In this case, it is preferable that the macromolecules exhibiting a photoisomerization reaction are azo polymer and/or spiropyran-polymer macromolecules. Moreover, it is preferable that the step for forming a (Continued)

nanoscale helical structure is repeated, and that a plurality of nanoscale helical structures are formed in two dimensions on the surface of the macromolecules. It is also preferable that the optical vortex is circularly polarized light, and that the total angular momentum (J) of the optical vortex is not 0.

9 Claims, 3 Drawing Sheets

(51) Int. Cl.
  *C08J 7/00*  (2006.01)
  *C08G 73/02*  (2006.01)
  *G02B 21/00*  (2006.01)
  *G02B 5/30*  (2006.01)
  *G02B 27/28*  (2006.01)
(52) U.S. Cl.
  CPC ......... *G02B 5/3033* (2013.01); *G02B 5/3083* (2013.01); *G02B 21/0096* (2013.01); *G02B 27/286* (2013.01)

(56) References Cited

FOREIGN PATENT DOCUMENTS

JP  2010-247230 A  11/2010
WO  2005-088409 A1  9/2005

OTHER PUBLICATIONS

Ruiz et al. "Generation of complex beams by means of polarization holograms", Proc. of SPIE, vol. 8429, Optical Modelling and Design II, 2012, p. 1-8.*

Junichi Hamazaki, Ryuji Morita, Keisuke Chujo, Yusuke Kobayashi, Satoshi Tanda, and Takashige Omatsu, Optical-Vortex Laser Ablation, Optics Express, vol. 18, Issue 3, Jan. 19, 2010, pp. 2144-2151.

Takashige Omatsu, Keisaku Chujo, Katsuhiko Miyamoto, Masahito Okida, Kazuki Nakamura, Nobuyuki Aoki, and Ryuji Morita, Metal Microneedle Fabrication Using Twisted Light With Spin, Optics Express, Nol. 18, Issue 17, Aug. 5, 2010 pp. 17967-17973.

Kohei Toyoda, Katsuhiko Miyamoto, Nobuyuki Aoki, Ryujimorita, and Takashige Omatsu, Using Optical Vortex to Control the Chirality of Twisted Metal Nanostructures, Nano Letters, 2012, 12 (7), pp. 3645-3649.

Nobuyuki Moronuki, "[Bisai Kako to Hyomen Kino Senmon Iinkai] Fabrication of Functional Surfaces With Micromachining Processes", Journal of the Japan Society of Precision Engineering, vol. 78(2012), No. 10, 2012, pp. 841 to 844.

Tomohiro Hirosea, Takashige Omatsu, Ryosuke Kato, Katsuyoshi Hoshina, Kenji Harada, Takeshi Watanabe, Masaaki Fujii, Azo-Benzen Polymer Thin-Film Laser Amplifier With Grating Couplers Based on Light-Induced Relief Hologram, Optics Communications, vol. 228, Issues 4-6, Dec. 15, 2003, pp. 279-283.

L. Allen, M. W. Beijersbergen, R.J. C. Spreeuw, and J.P. Woerdman, Orbital Angular Momentum of Light and the Transformation of Laguerre-Gaussian Laser Modes; Physical Review A vol. 45, No. 11, The American Physical Society, Jun. 1, 1992.

* cited by examiner

AFM image laser scanning microscope image

AFM image

METHOD FOR PRODUCING ORGANIC HELICAL STRUCTURE, AND ORGANIC HELICAL STRUCTURE PRODUCED USING SAID METHOD

TECHNICAL FIELD

The present invention relates to an organic helical structure and a method for producing the same.

BACKGROUND OF THE INVENTION

An optical vortex is a light wave that has characteristic properties such as an angular momentum which derives from a phase singularity, and a doughnut-shaped intensity distribution.

A representative example of the optical vortex is Laguerre-Gaussian beam (See the undermentioned NON-PATENT DOCUMENT 1).

Laguerre-Gaussian beam is an intrinsic solution of a wave equation in a cylindrical coordinate system.

It satisfies the periodic boundary condition that the phase rotates by an integer multiple of 2 pi around the rotation center when the beam propagates for every 1 wavelength.

Therefore, it is possible to express the magnitude of the angular momentum by using the quantum number L (L=1, 2, 3 . . . ).

The wave surface of an optical vortex has a helical shape. An orbital angular momentum is generated in the direction which is given by vector difference between the normal direction of a wave surface and the propagation direction of an optical vortex.

Further, an optical vortex can be utilized for a light manipulation which uses light radiation pressure, a microscope with high resolution which uses phase singularity, an optical vortex ablation processing which actively uses orbital angular momentum etc. Therefore, future industrial applications of the optical vortex are highly expected.

As prior art of oscillating an optical vortex, there is a device which is described in below-described non-patent document 1.

RELATED ART DOCUMENTS

Patent Document

[PATENT DOCUMENT] WO2012/169578

Non-Patent Document

[NON-PATENT DOCUMENT 1] L. Allen, M. W. Beijersbergen, R. J. C. Spreeuw, and J. P. Woerdman, "Orbital angular momentum of light and the transformation of Laguerre-Gaussian laser modes," Phys. Rev. A 45, 8185-8189 (1992)

SUMMARY OF THE INVENTION

Problems to be Solved by the Invention

However, technologies which were described in the above-mentioned PATENT DOCUMENT 1 and NON-PATENT DOCUMENT 1 think of the method itself for oscillating an optical vortex as the main point.

There is still a room to study applications using an optical vortex, which include the above enumerated light manipulation.

Accordingly, in consideration of the above-mentioned problem, the object of the invention is to propose a possibility of new applications of an optical vortex.

Means for Solving the Problems

In intensive studies for solving the above problems, the inventors have discovered that when an optical vortex was irradiated to an azo-based polymer which exhibits a photoisomerization reaction, a nanoscale helical structure was formed on the surface of the azo-based polymer. The inventors thereby have completed the present invention.

Namely, a method for producing an organic helical structure as one embodiment of the present invention is characterized by irradiating the surface of a polymer which exhibits a photoisomerization reaction with an optical vortex, and thereby forming a nanoscale helical structure on the surface of the polymer.

In one embodiment of the present invention, it is preferable that the polymer which exhibits a photoisomerization reaction comprises at least one of an azo-based polymer and a spiropyran-based polymer, though the polymer is not limited to them.

Moreover, in one embodiment of the present invention, it is preferable that the step for forming the nanoscale organic helical structure on the surface of the polymer is repeated, and thereby a plurality of the nanoscale organic helical structures are formed bidimensionally on the surface of the polymer.

Furthermore, an organic helical structure as another embodiment of the present invention is such that a nanoscale helical structure is formed on the surface of a polymer which exhibits a photoisomerization reaction.

Effects of the Invention

As mentioned above, by the present invention, a possibility of new applications of the optical vortex can be provided.

Moreover, a plurality of the helical structures provided by the present invention can be arranged bidimensionally in nano-level. Herewith, applications of the helical structure of the present invention can be expected in various fields such as a metamaterial which exhibits optical rotation in the terahertz wave region, a bio-MEMS, a circular dichroism light emitter or light absorber, an organic solar cell etc.

BEST MODE FOR CARRYING OUT THE INVENTION

Hereinafter, embodiments of the present invention are explained with reference to the drawings.

However, the present invention can be practiced under many different embodiments and should not be limited to embodiments and concrete examples described below.

A method for producing an organic helical structure pertaining to this embodiment is characterized by irradiating the surface of a polymer which exhibits a photoisomerization reaction with an optical vortex, and thereby forming a nanoscale organic helical structure on the surface of the polymer.

In this embodiment, "optical vortex" means the light wave which has characteristic properties such as an angular momentum and orbital angular momentum which derive from a phase singularity, and a doughnut-shaped intensity distribution For generating an optical vortex, an optical vortex laser oscillator (hereinafter referred to as "the laser oscillator"), shown in FIG. 1, can be employed, though the laser oscillator is not limited to this one.

Figure 1:
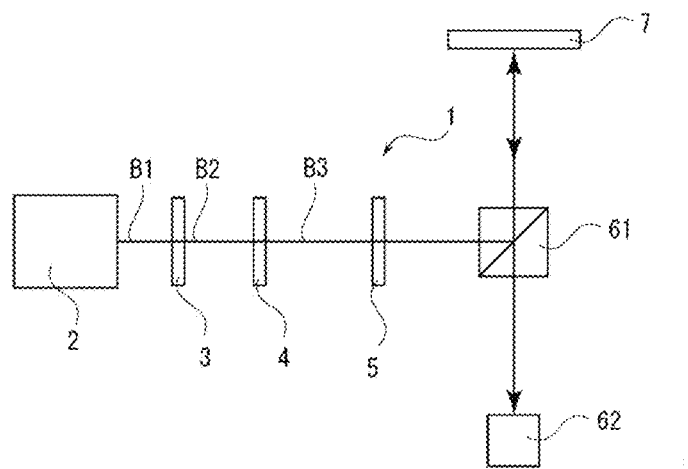
FIG. 1 shows a schematic of an optical vortex laser oscillator for generating an optical vortex of the embodiment.

FIG. 1 shows a schematic of an outline of the optical system of the optical vortex laser oscillator 1 pertaining to this embodiment. As shown in this figure, the laser oscillator 1 comprises a laser light source 2 which emits laser light B1, an optical vortex generator 3 which generates optical vortex B2 based on laser light B1, a quarter wave plate 4 which changes optical vortex B2 into circularly polarized light B3, and a light condenser 5 which condenses the circularly polarized light.

In this embodiment, as described above, the laser light source 2 can emit laser light B1.

A solid laser such as a YAG laser, a dye laser, a gas laser such as a He—Ne laser, or semiconductor laser such as a LD laser etc. can be used as the laser light source 2. But, the laser light source 2 is not limited to them, as long as it has the above-mentioned function.

In this embodiment, it is preferable that a wavelength region of the light which is emitted from the laser light source 2 is the wavelength region such that a irradiation object can cause a photoisomerization reaction.

It is preferable that the wavelength is in the region from the ultraviolet region to the near infrared region. It is more preferable that the wavelength is 350 nanometer or more and 1 micrometer or less. However, this wavelength region is adjustable depending on a material for the irradiation object.

Moreover, in this embodiment, it is preferable that the laser light source 2 is a continuously oscillating laser light source which can oscillate continuous laser light.

By using the continuously oscillating laser light source, it becomes possible to continue to irradiate a polymer with an optical vortex continuously.

A pulsed oscillating laser light is usable. In this case, it is preferable that the pulse rate is sufficiently high for maintaining the photoisomerization reaction.

Moreover, in this embodiment, the optical vortex generator 3 can generate the optical vortex B2 based on the laser light B1 which the laser light source 2 generates.

For example, a phase plate, a space phase modulator, a multimode area fiber amplifier etc. are adoptable as the optical vortex generator 3, though not limited to them.

In addition, the structure which directly generates the optical vortex by combining the laser light source 2 and the optical vortex generator 3 is adoptable.

It is especially preferable that the optical vortex which is generated by the optical vortex generator is coherent.

Moreover, in this embodiment, the quarter wave plate 4 is used for changing an optical vortex to circularly polarized light B3.

However, in cases where the optical vortex generator 3 can generate circularly polarized light, the quarter wave plate 4 can be omitted.

In this embodiment, by installing the quarter wave plate, it becomes possible to form a helical structure on the surface of a polymer which exhibits a photoisomerization reaction.

Moreover, in this embodiment, the light condenser 5 is used for condensing the light and effectively irradiating the surface of the polymer 7 which exhibits a photoisomerization reaction with the condensed light.

However, a structure of the light condenser is not limited as far as the light condenser can effectively irradiate circularly polarized light which has been changed from an optical vortex.

For example, it is preferable that the light condenser comprises a microscope objective lens. Then, the beam diameter can be adjusted to a desired diameter by the microscope objective lens.

In this embodiment, in addition to the above configuration, an observation unit 6 for observing the surface of a polymer which exhibits a photoisomerization reaction may be installed.

It is preferable that the observation unit 6 comprises a light splitting element 61 which splits an optical vortex which has been condensed by the above-mentioned light condenser 5, and an imaging element 62 for observing the light reflected from the surface of a polymer which exhibits a photoisomerization reaction.

In addition, the imaging element 62 can be exemplified by a CCD camera, though the imaging elements 62 is not limited to the CCD camera. Further, it is preferable that a data processing device such as a so-called personal computer is connected to the CCD camera, and the image data is processed by the data processing device.

Moreover, in this embodiment, the polymer exhibiting a photoisomerization reaction, to which an optical vortex is irradiated, is a polymer which can exhibit a photoisomerization reaction wherein the polymer becomes one of two structural isomers by optical vortex irradiation.

For example, it is preferable that the polymer exhibiting a photoisomerization reaction comprises at least one of an azo-based polymer and a spiropyran-based polymer. But the polymer is not limited to them, as far as it has the above-mentioned function.

Here, "azo-based polymer" means a polymer which has azo group in an unit which constitutes the polymer. The azo-based polymer has structural isomers such as cis-type and trans-type.

Further, concrete examples of the chemical compounds which have azo group include azobenzene and azobenzene derivatives which have a substituent bonding to a carbon atom of azo benzene. However, the chemical compounds which have azo group are not limited to them, as far as they exhibit a photoisomerization reaction.

Moreover, in this embodiment, "spiropyran-based polymer" means a polymer which has a structure in which two pyran rings bind through a spiro bond, namely spiropyran, in a unit which constitutes the polymer. The spiropyran ring can be in one of at least two states such as a cyclic state and an open ring state. Spiropyran-based polymer is exemplified by spirobenzopyran-polymer and spirobenzopyran derivative-polymer which have a substituent bonded to the spirobenzopyran. However, the spiropyran-based polymer is not limited to them, as far as they exhibit a photoisomerization reaction.

Moreover, in this embodiment, rhodopsin-based polymer is also usable. "Rhodopsin-based polymer" means a polymer which has rhodopsin in an unit which constitutes the polymer.

Since the structure of rhodopsin is also changed by irradiation of an optical vortex, it is possible to produce a nanoscale helical structure.

Moreover, in this embodiment, in cases where the energy of irradiated optical vortex is too small, it is not possible to form a helical structure. On the other hand, if the energy of irradiated optical vortex is too large, the polymer will be decomposed. So, it is preferable that the energy is in an appropriate range.

It is preferable that the energy is 1 microwatts or more and 1 milliwatts or less. However, the energy is adjustable depending on a polymer material and the energy is not limited to that range.

In this embodiment, it is possible to form a nanoscale helical structure on the surface of a polymer by irradiating the surface of a polymer which exhibits a photoisomerization reaction with an optical vortex.

The main mechanism for forming the helical structure is mass transfer by the photoisomerization reaction.

When an optical vortex is irradiated to metal, a helical needle is formed on the metal surface.

However, the phenomenon which mainly occurs in dynamics for forming the helical needle is the physical phenomenon such as metal melting and metal evaporation.

The final result that the helical structure is formed by irradiation of an optical vortex appears to be the same as the case of the polymer. However, the phenomenons are completely different.

There is no precedent that a nanoscale helical structure is formed on the surface of a azo-based polymer thin film by irradiation of an optical vortex, as shown in this embodiment. This invention is the first report in the world Concretely, in polymers which exhibit a photoisomerization reaction, a mechanical spatial movement of molecules occurs via photoisomerization reaction. For better explanation, in an example of azo-based polymer and azobenzene, this mechanism is explained. Azobenzene has two structural isomers. One of them is trans-type and the other is cis-type. At room temperature, azobenzene is trans-type.

When an optical vortex corresponding to absorption wavelength is irradiated to trans-type azobenzene, the trans-type azobenzen becomes cis-type one.

Since the volume of cis-type azobenzene is larger than that of trans-type azobenzene, the distance between molecules becomes longer and the molecular attraction becomes weaker.

As a result, the polymer surface becomes soft. Mass transfer occurs in the softened polymer by light gradient force of the optical vortex.

The trans-cis isomerization reaction is a reversible reaction. When irradiating the optical vortex is stopped, the cis-type azobenzene immediately becomes trans-type azobenzene. Then, the polymer surface solidifies again, and the relief is formed on the polymer surface.

Further, the molecular transfer of azo polymer, especially azobenzene polymer, has large dependence on the polarization.

Accordingly, it is necessary to use circularly polarized optical vortex as mentioned in the examples, for minimizing the effect of the polarization dependence of azobenzene polymer.

Figure 2:
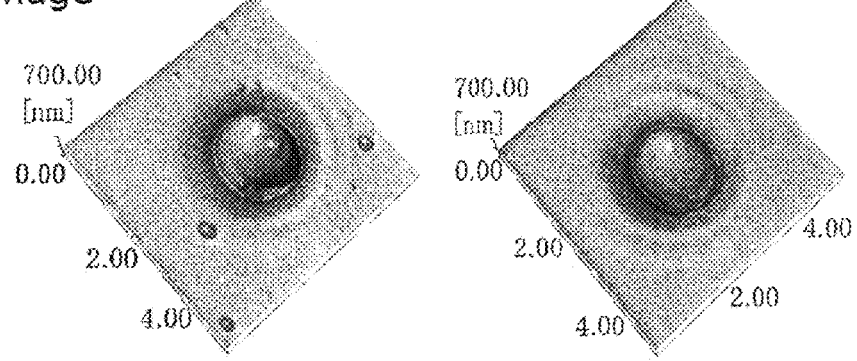
FIG. 2 shows the surface condition of an organic helical structure pertaining to the embodiment and the example.
Figure 2:
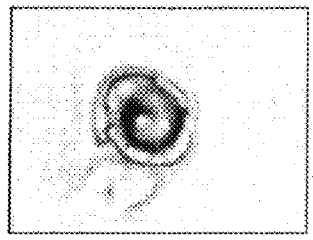
Figure 2:
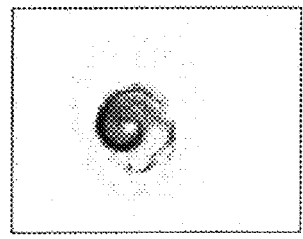

And then, the relief on the surface, which is formed by irradiating circularly polarized optical vortex, has a helical structure which corresponds to the helicity of the wave surface of the optical vortex or a size of the total angular momentum. AFM images and laser scanning type microscope images in cases where the total angular momentum, the orbital angular momentum, or the spin angular momentum is changed, are shown in FIG. 2.

On the other hand, in this embodiment, it is possible to form a convex shape by irradiating a linear polarized optical vortex, but it is difficult to form a helical structure by irradiating a linear polarized optical vortex.

Figure 3:
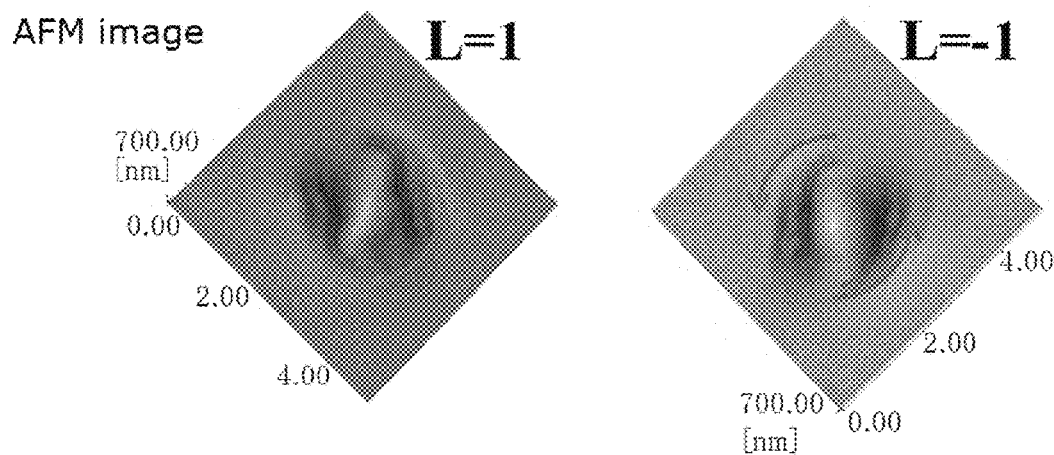
FIG. 3 shows an AFM image of the surface condition of an organic helical structure.

AFM images in this case are shown in FIG. 3.

As a result, according to the method pertaining to this embodiment, since it can be confirmed that the direction of the helical wave surface of optical vortex corresponds to the direction of the helix of the helical structure, there is an effect such that it is possible to surely decide the chirality of the helical structure. Further, this manipulation can be performed in very short time, and there is also an effect such that it is possible to form it in very high yield and in short work time than other chemical processes.

Moreover, in this embodiment, it is preferable that by repeating the step for forming the nanoscale helical structure, a plurality of the nanoscale helical structures are formed on the surface of a polymer bidimensionally.

As described above, it becomes possible to provide a possibility of new applications of an optical vortex by the present invention.

Moreover, helical structures provided by the present invention can be bidimensionally arranged easily only in a few seconds.

Thereby, applications of the helical structure are expected in various fields such as a metamaterial which has optical rotation in the terahertz wave region, a bio-MEMS, a circular dichroism light emitter or light absorber, and an organic solar cell etc.

EXAMPLE

Measurements with respect to the present invention were actually performed and effects of the present invention were confirmed.

Hereafter, they will be explained concretely.

First, in the optical system as shown in FIG. 1, CW laser whose center wavelength was 532 nanometers was irradiated to an azo polymer via a helical phase plate (SPP), a quarter wave plate (QWP), and an object lens (NA-0.44).

The spot diameter of the laser which was irradiated to the azo polymer was 3 micrometers.

Figure 4:
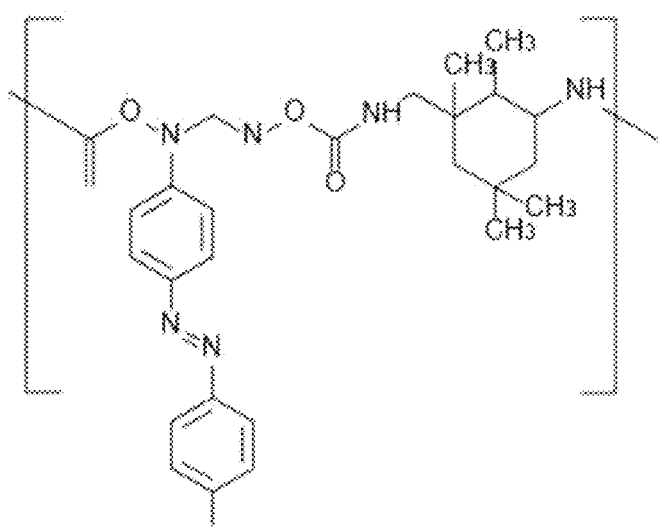
FIG. 4 shows a chemical formula of Poly-Orange Tom-1.

Moreover, Poly-Orange Tom-1 (hereinafter referred to as "POT", see FIG. 4 for the structure) was used as the azo polymer.

Here, the concentration of the POT in cyclohexane as the solvent was 16.6% by weight, the condition of spin coating was for 10 sec. at 250 rpm and for 60 sec. at 4000 rpm, and a thin film was formed on a glass substrate by coating with the POT.

Incidentally, circularly polarized optical vortex can be irradiated while adjusting the magnitude of the total angular momentum ($J=1+s$), which is the sum of an orbital angular momentum ($L=-1$ or $1$) obtained by a SPP and a spin angular momentum ($s=-1$ or $1$) obtained by a QWP.

And then, in the above-mentioned arrangement, only the direction of the QWP was changed, and surface relief forming was performed in the condition of $J=2$ and $J=0$.

Figure 5:
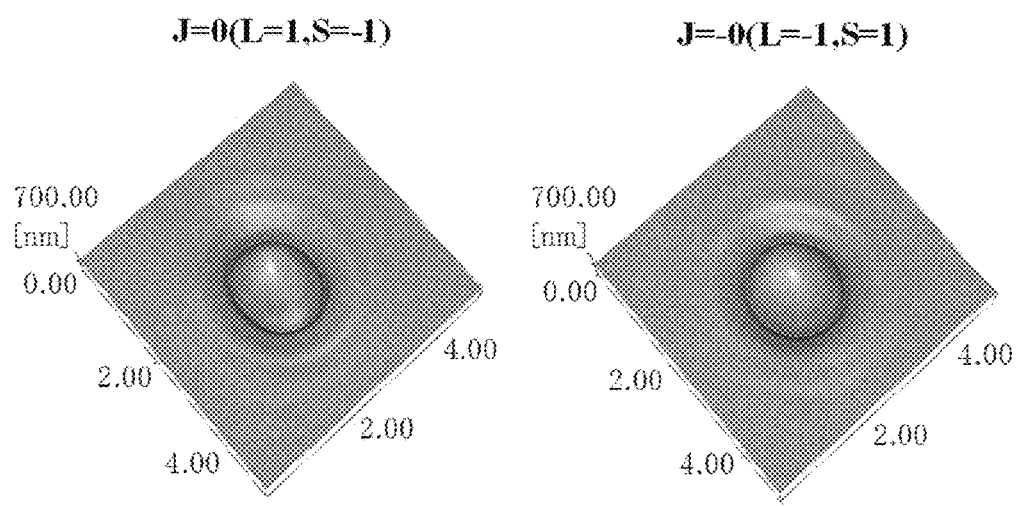
FIG. 5 shows an AFM image of the surface condition of an organic helical structure.

The results are shown in FIG. 2 and FIG. 5, respectively.

As a result, the height of the center of the protrusion was about 400 nm at $J=2$, and it was about 300 nm at $J=0$, In the case of |J|=2, it was confirmed that a helical structure was formed on the protrusion part.

Moreover, it was confirmed that the rotation direction of the helix was clockwise at J=2, and it was counterclockwise at J=−2.

From this result, it was confirmed that it was possible to control the chirality structure by the magnitude of the angular momentum.

It is supposed that this difference comes from the difference of spatial distribution of the total angular momentum of the light.

On the other hand, it is thought that since the azo polymer can not receive the angular momentum from the optical vortex in the case of J=0, the surface relief was formed under only the effect of the light gradient power, and the protrusion having no helical structure was formed.

Moreover, also in cases where linear polarized light was irradiated without installing a quarter wave plate, it was confirmed that a protrusion having no helical structure was formed as shown in the above-mentioned FIG. 3.

INDUSTRIAL APPLICABILITY

The present invention is industrially applicable as a method for producing an organic helical structure and an organic helical structure produced using said method.

Especially, applications of the organic helical structure can be expected in various fields such as a metamaterial which has optical rotation in the terahertz wave region, a bio-MEMS, a circular dichroism light emitter or light absorber, and an organic solar cell etc.

What is claimed is:

1. A method for producing an organic helical structure comprising irradiating a surface of a polymer film with a circularly polarized optical vortex, wherein the polymer of the polymer film exhibits a photoisomerization reaction, and thereby forming a nanoscale organic helical structure on the surface of the polymer film.

2. The method for producing the organic helical structure according to claim 1, wherein the polymer which exhibits the photoisomerization reaction comprises at least one of an azo-based polymer, a spiropyran-based polymer, and a rhodopsin-based polymer.

3. The method for producing the organic helical structure according to claim 1, wherein the step for forming the nanoscale organic helical structure on the surface of the polymer film is repeated, and thereby a plurality of the nanoscale organic helical structure are formed bidimensionally on the surface of the polymer film.

4. The method for producing the organic helical structure according to claim 1, wherein the total angular momentum J of the optical vortex is not 0.

5. The method for producing the organic helical structure according to claim 1, wherein an energy of irradiated circularly polarized optical vortex is 1 microwatts or more and 1 milliwatts or less.

6. The method for producing the organic helical structure according to claim 5, wherein the polymer which exhibits the photoisomerization reaction comprises at least one of an azo-based polymer, a spiropyran-based polymer, and a rhodopsin-based polymer.

7. The method for producing the organic helical structure according to claim 5, wherein the step for forming the nanoscale organic helical structure on the surface of the polymer film is repeated, and thereby a plurality of the nanoscale organic helical structure are formed bidimensionally on the surface of the polymer film.

8. The method for producing the organic helical structure according to claim 5, wherein the total angular momentum J of the optical vortex is not 0.

9. An organic helical structure wherein a nanoscale helical structure is formed by irradiating a circularly polarized optical vortex on a surface of a polymer film wherein the polymer of the polymer film exhibits a photoisomerization reaction.

* * * * *